UNITED STATES PATENT OFFICE.

ARTHUR EDWARD GIBBS, OF NIAGARA FALLS, NEW YORK.

PROCESS OF PRODUCING CHLORATES AND BICHROMATES.

No. 802,205.      Specification of Letters Patent.      Patented Oct. 17, 1905.

Application filed March 1, 1904. Serial No. 195,994.

*To all whom it may concern:*

Be it known that I, ARTHUR EDWARD GIBBS, a subject of the King of Great Britain, residing at Niagara Falls, in the county of Niagara and State of New York, have invented a Process of Producing Chlorates and Bichromates of the Alkalies or Alkaline-Earth Metals, of which the following is a specification.

Chlorates of the alkalies—namely, chlorates of soda and potash—have been made heretofore by electrolyzing a solution of the corresponding chlorids in a cell without a diaphragm and crystallizing out the chlorate salt thereby produced. In the process heretofore employed for making bichromates of the alkalies it has been the practice to treat the normal chromate with sulfuric acid according to the following equation:

$$2Na_2CrO_4 + H_2SO_4 = Na_2SO_4 + Na_2Cr_2O_7.$$

The products of this reaction are sodium sulfate and sodium bichromate. The sodium sulfate is a product of little utility and does not contribute to the commercial value of the operation.

I have discovered a simple process by which bichromates and chlorates can be made simultaneously and two valuable products thus obtained at one operation. The process is cheaper than the processes heretofore employed, and the double product which it yields renders it of great commercial value.

My invention consists in subjecting a solution of chromate to chlorin either by passing through such solution a stream of chlorin gas externally manufactured or by forming chlorin in the solution by electrolytic action. Where the chlorin gas is made externally and then passed through the chromate solution, I place in a suitable vessel a solution of normal chromate, preferably as strong as practicable, and pass through it a stream of chlorin gas or agitate it with chlorin gas. Taking sodium bichromate as an example, the reaction takes place according to the following equation:

$$6Na_2CrO_4 + 6Cl = 3Na_2Cr_2O_7 + 5NaCl + NaClO_3$$

The temperature at which the reaction takes place is preferably the temperature best suited for the formation of chlorate—namely, between 70° and 80° centigrade; but I have obtained good current efficiency at a temperature of 35° centigrade. The higher temperatures are preferable, especially with platinum anodes, on account of the higher efficiency obtained and the lower resistance of a cell when running with a hot electrolyte. In conducting the operation in an electrolytic cell with platinum anodes I prefer to use a current density of from two to three amperes per square inch at about 4.5 volts, while with carbon anodes a density of from .5 to .75 amperes or less is preferable, each cell then taking about three volts.

The products of the reaction above stated are sodium bichromate, sodium chlorate, and sodium chlorid, the first two of which are of important commercial value. They may be separated from the solution by crystallizing or by any other suitable method.

Where the chlorin is formed in the solution which is to be treated, I place the solution of normal chromate with sodium chlorid in an electrolytic cell whose anode and cathode are separated by a porous diaphragm of asbestos or other material not appreciably attacked by caustic alkali or bichromate. The anode may be of platinum or other conducting substance which is not too readily destructible by the operation, and the cathode may be of iron or other conducting substance not attacked by caustic alkali. When a current is passed through such cell, the chlorin formed at the anode by decomposition of the chlorid will immediately react with the normal chromate in accordance with the equation last above stated.

The solutions of normal chromate and chlorid may be mixed; but I may put the chlorid solution into the cathode-compartment of the cell and the chromate solution into the anode-compartment. The products of decomposition are withdrawn from the anode-compartment either intermittently after electrolysis has sufficiently proceeded or the apparatus may be arranged for the continuous withdrawal of the products by feeding and withdrawing the solution gradually. This is best effected by employing a series of cells and passing the solution from one to the other. When the liquor has been withdrawn, the bichromate and chlorate are separated, and the chlorid may then be returned to the electrolytic cell with additions of normal chromate, more chlorid being added to replace that which is consumed in producing chlorate. If it be desired to increase the proportion of chlorate relatively to the bichromate in the resulting solution, I add from time to time to the anode-compartment of the cell a little alkali, preferably an alkali of the metal which constitutes the base of the chromate solution, and this alkali reacting with the bichromate converts it wholly or in part into normal chromate according to the following equation:

$$Na_2Cr_2O_7 + Na_2O = 2Na_2CrO_4.$$

The bichromate product of the operation is thus transformed wholly or in part to normal chromate, while the chlorate product is unaltered.

Those skilled in the art will be able to modify my process in many ways, and by substituting the chromate of other alkalies or alkaline-earth metals the corresponding bichromates and chlorates may be produced.

I claim—

1. The method herein described which consists in reacting with chlorin on a chromate in solution, thereby simultaneously producing bichromate and chlorate.

2. The method herein described which consists in electrolyzing a solution containing a chlorid and a chromate, and isolating the cathode products, thereby simultaneously producing bichromate and chlorate.

3. The method herein described which consists in subjecting to electrolysis in a diaphragm-cell a solution containing chromate and a chlorid and producing thereby bichromate and chlorate; substantially as described.

4. The method herein described which consists in subjecting to electrolysis in a diaphragm-cell a solution containing a chlorid and a chromate; substantially as described.

5. The method herein described which consists in subjecting to electrolysis in a diaphragm-cell a solution containing chromate and a chlorid, producing thereby bichromate and chlorate, withdrawing the solution from the cell from time to time, separating the chlorate and bichromate, and returning the chlorid to the cell with additions of normal chromate; substantially as described.

6. The method herein described which consists in simultaneously producing bichromate and chlorate by treating a chromate solution with chlorin, and adding alkali to transform the produced bichromate to chromate; substantially as described.

In testimony whereof I have hereunto set my hand.

ARTHUR EDWARD GIBBS.

Witnesses:
    Geo. B. Bleming,
    Thomas W. Bakewell.